United States Patent [19]
Kishino

[11] Patent Number: 5,128,714
[45] Date of Patent: Jul. 7, 1992

[54] STRUCTURE OF A FILM HOLDER

[75] Inventor: Hideaki Kishino, Tokyo, Japan

[73] Assignee: Nikon Corporation, Tokyo, Japan

[21] Appl. No.: 739,097

[22] Filed: Aug. 1, 1991

[30] Foreign Application Priority Data

Aug. 29, 1990 [JP] Japan .................. 2-89521[U]

[51] Int. Cl.$^5$ .................. G03B 27/62; G03B 27/64
[52] U.S. Cl. .................................................. 355/76
[58] Field of Search ................................. 355/75, 76

[56] References Cited

U.S. PATENT DOCUMENTS

| 1,600,709 | 9/1926 | Bhosys | 355/76 |
|---|---|---|---|
| 2,995,979 | 8/1961 | Gordon et al. | 355/75 |
| 3,132,560 | 5/1964 | Pignone et al. | 355/75 |
| 3,511,565 | 5/1970 | Harmon, Jr. et al. | 355/75 |
| 4,396,282 | 8/1983 | Anderson | 355/76 |
| 4,736,228 | 4/1988 | Ito | 355/75 |
| 4,774,553 | 9/1988 | Blanding et al. | 355/75 |

Primary Examiner—Richard A. Wintercorn
Attorney, Agent, or Firm—Shapiro and Shapiro

[57] ABSTRACT

The structure of a film holder used for an image transmitter or the like for directly transmitting a filmed image comprises a base plate, a film receiving plate having film positioning projections and a film window, which is arranged rotatively within the surface of the base plate, a clip plate arranged in the opposite side of the film receiving plate against the base plate, a pressure plate having a film window and in cooperation with the film receiving plate, holding the film therebetween, a pivotally supporting member to support the pressure plate pivotally against the film receiving plate to allow the pressure plate to be opened or closed freely with respect to the film receiving plate, and a spring to provide a rotational peculiarity for the pressure plate in the closing direction to cause the pressure plate to be in contact with the film receiving plate under pressure.

7 Claims, 9 Drawing Sheets

STRUCTURE OF A FILM HOLDER

BACKGROUND OF THE INVENTION

1. Field of the Invention

The present invention relates to the structure of a film holder used for an image transmitter or the like for directly transmitting a filmed image.

2. Related Background Art

Figure 1:
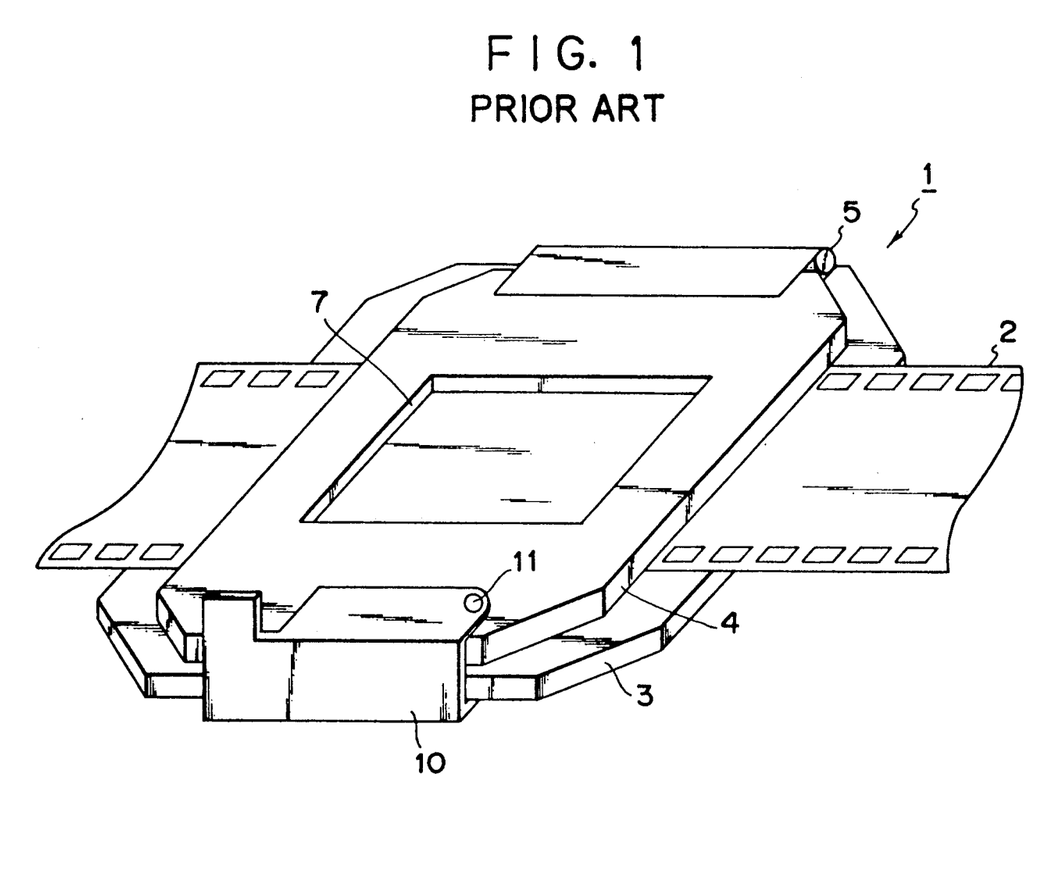
FIG. 1 is a perspective view showing a conventional film holder.
Figure 2:
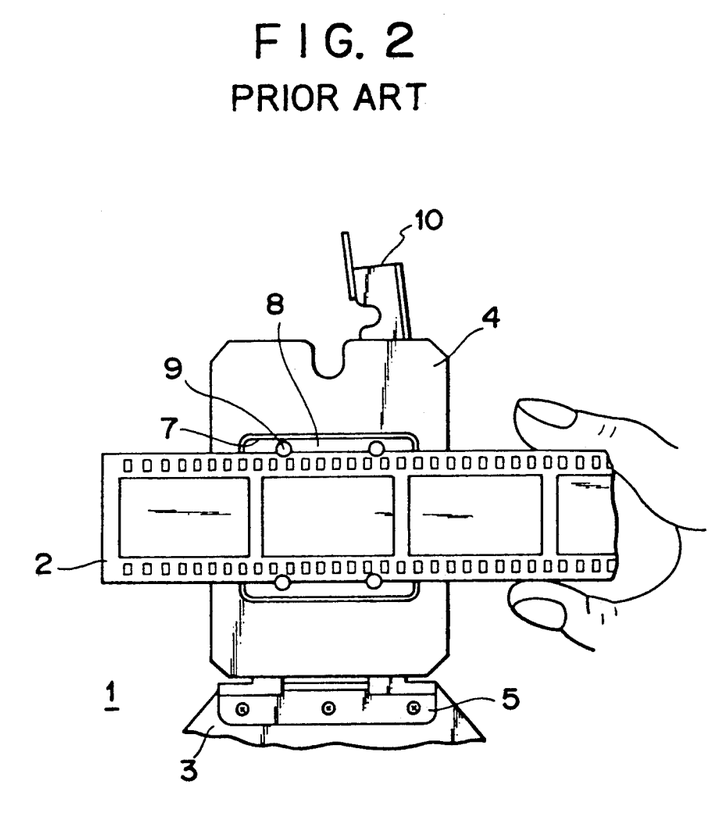
FIG. 2 is a view illustrating the state of setting a film onto the aforesaid film holder.
Figure 3:
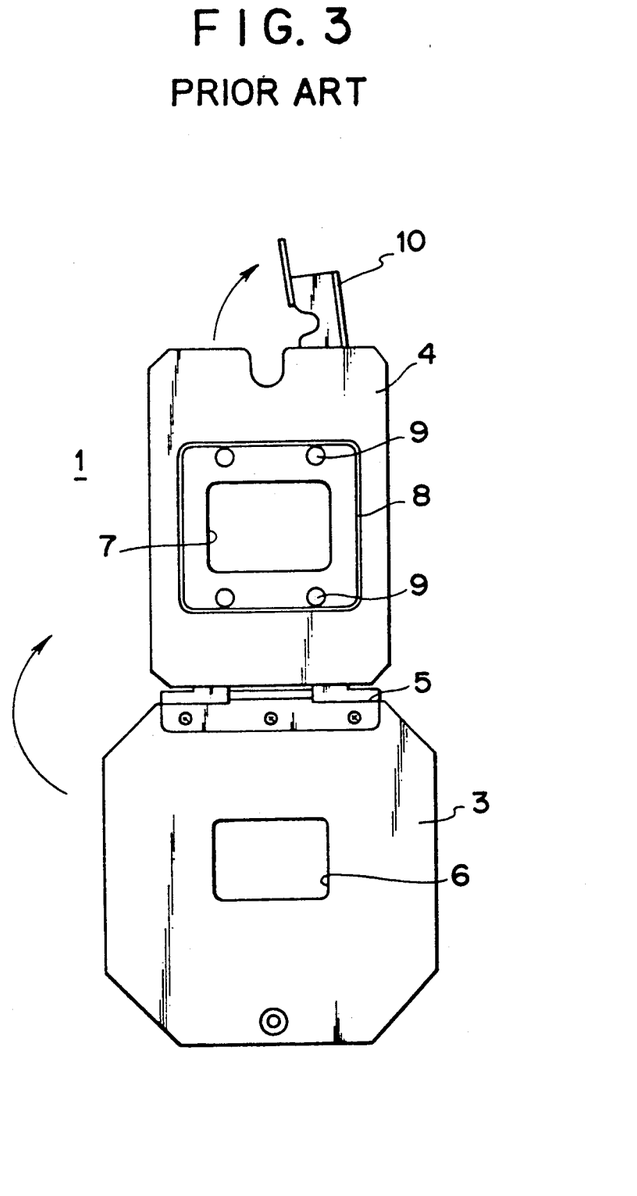
FIG. 3 is a view illustrating the state where the aforesaid film holder is opened.

Traditionally, as a film holder used for an image transmitter, there has been known the one having a structure as shown in FIG. 1 through FIG. 3. In other words, this film holder 1 comprises two plates, i.e., a base plate 3 and a film pressure plate 4, sandwiching a film (35 mm film) 2, and its structure is so arranged that one end of the film pressure plate 4 is coupled to a hinge 5 to allow it to be opened or closed freely. In the central portions of the base plate 3 and the film pressure plate 4, film apertures 6 and 7 are provided to overlap with each other. Also, to the film aperture portion 7 of the film pressure plate 4, a frame type pressure plate 8 is installed resiliently by a flat spring (not shown) to compress the film 2 against the base plate 3. Further, to this pressure plate 8, four posts 9 for fitting the film 2 are installed to regulate its shifting in the fore and back directions. These posts 9 are resiliently held by flat springs (not shown) other than the one holding the pressure plate 8 and are projected from the film pressure face of the pressure plate 8. The aforesaid film pressure plate 4 is closed when the film 2 is set between the 5 aforesaid posts 9 and is hooked onto the base plate 3 by a hook 10. At this juncture, the film 2 is compressed onto the upper face of the base plate 3 by the pressure plate 8. The aforesaid hook 10 is substantially U shaped, and one end thereof is rotatively supported by a axle pin 11 and installed at the end of the opposite side of the hinge 5 side of the aforesaid film pressure plate 4. When the film pressure plate 4 is closely in contact with the base plate 3, the hook is closed to sandwich the ends of both plates.

Then, the film holder 1 with the film 2 thus set thereon is incorporated in the image transmitter at a predetermined position. However, in this state the position of the film holder 1 (angle of the field of the film) is arbitrary, and the adjustment of this position and the correction of the image inclination are performed by shifting the film holder 1 itself, while projecting the film image on the picture frame in the finder provided in the main body side of the systems, to match these two with the picture frame in the finder.

Nevertheless, in a conventional film holder 1 such as this, the two operations, the adjustment of the film holder 1 and the correction of the image inclination, should be performed simultaneously because its mounting position to the main body of the systems is arbitrary and is not constant. Therefore, a certain period of time is required at the time of setting the film.

Also, the film 2 should be set between the posts 9 while the film pressure plate 4 is open. Then, the film pressure plate 4 is closed to hold the film 2 securely for the first time by contacting the film pressure plate 4 and the base plate 3 with the hook 10. Consequently, it is not easy to set a film onto the film holder 1 because if the curl of the film 2 is great at the time of setting the film 2 between the posts 9, it is caused to be raised from the pressure plate 8 to be off from the posts 9 or slipped off therefrom; thus making it difficult to set the film to the film holder 1, causing a problem to arise that it takes a time to carry out a proper film setting.

SUMMARY OF THE INVENTION

Therefore, the structure of the film holder according to the present invention is designed in consideration of the problem encountered in the conventional holder set forth above, and the object of the present invention is to provide the structure of a film holder capable of simply performing with a comparatively simple structure the correction of the film inclination by the single body of the film holder itself as well as setting a film with a one-touch motion.

In order to achieve the above-mentioned object, the film holder of the present invention comprises a base plate; a film receiving plate having projections for positioning the film and a film window, which is arranged on the aforesaid base plate rotatively within the surface thereof; and a pressure plate with a film window to hold the film in cooperation with the aforesaid film receiving plate by interposing it therebetween. This pressure plate is pivotally supported at its one end against the aforesaid film receiving plate to be freely opened or closed, and is provided with a rotational peculiarity in the closing direction by the tension of a spring to be in contact with the aforesaid film receiving plate under pressure.

In the present invention, the film receiving plate and the pressure plate hold a film therebetween and allow it to be rotated against the base plate to correct the inclination of the film image. The pressure plate is tensioned by a spring in the closing direction to compress the film onto the film receiving plate. The projections for positioning the film are installed on the film receiving plate to position the film.

DETAILED DESCRIPTION OF THE PREFERRED EMBODIMENTS

Hereinafter, the present invention will be described in detail in accordance with the embodiments thereof in conjunction with the accompanying drawings.

Figure 4:
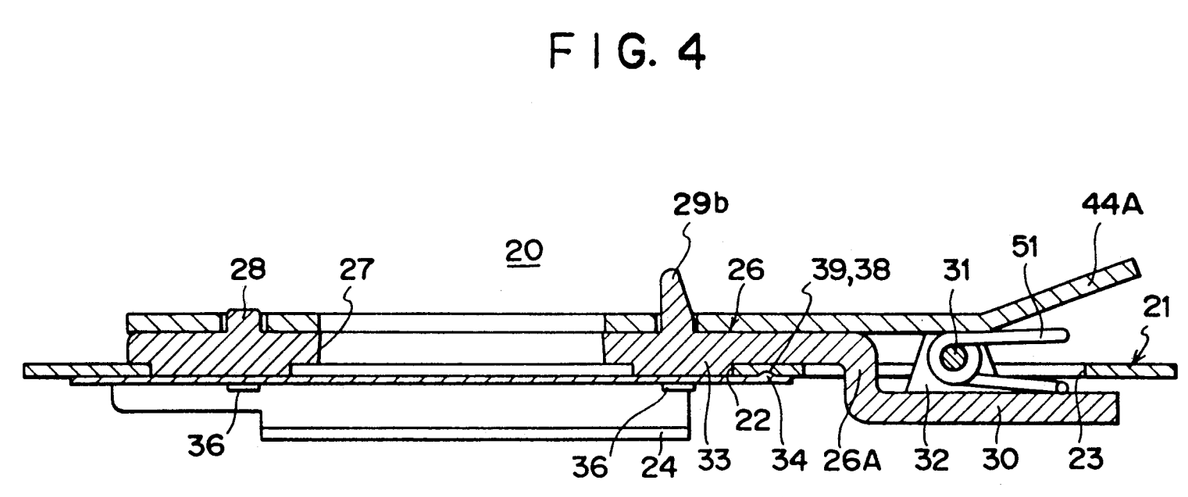
FIG. 4 is an enlarged section of a film holder according to the present invention taken along the line IV—IV of FIG. 5.
Figure 5:
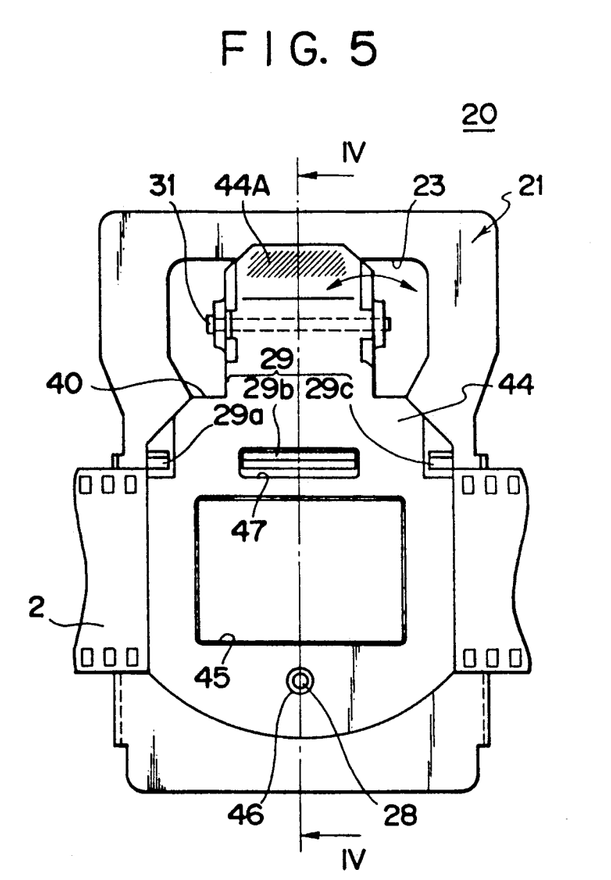
FIG. 5 is a plan view of the aforesaid film holder.
Figure 6:
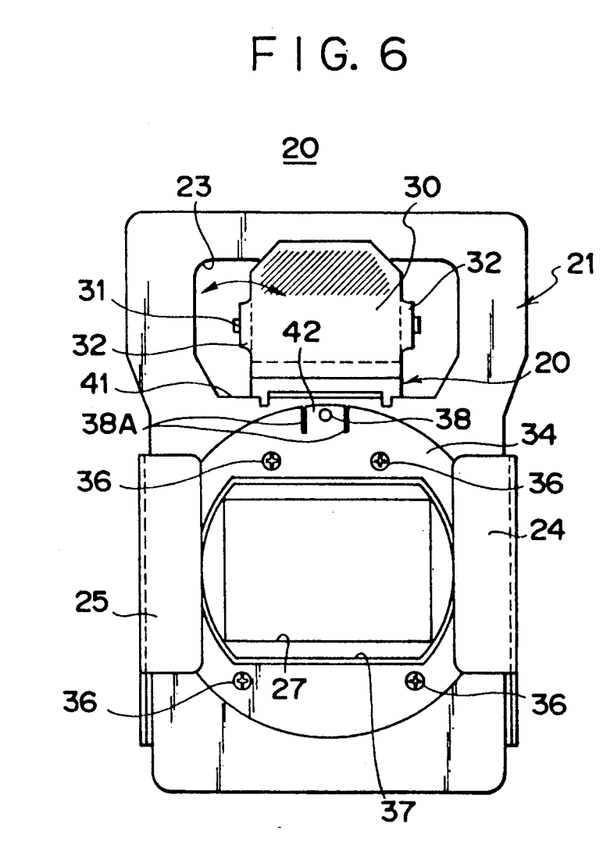
FIG. 6 is a bottom view of the aforesaid film holder.
Figure 7:
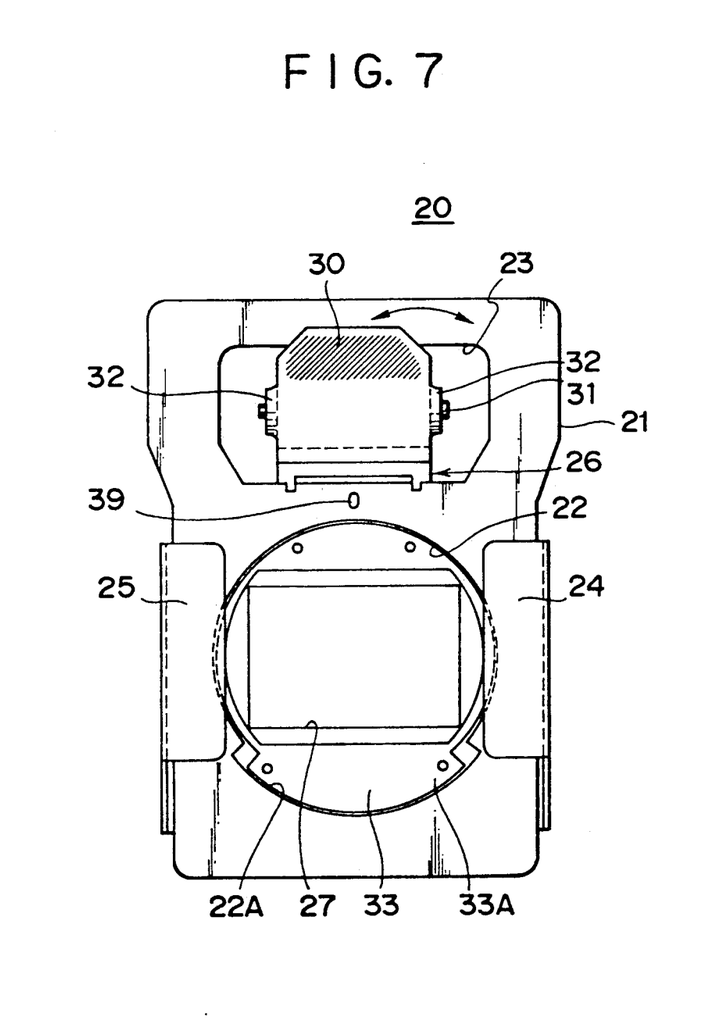
FIG. 7 is a bottom view of the aforesaid film holder after removing the clip plate thereof.
Figure 8:
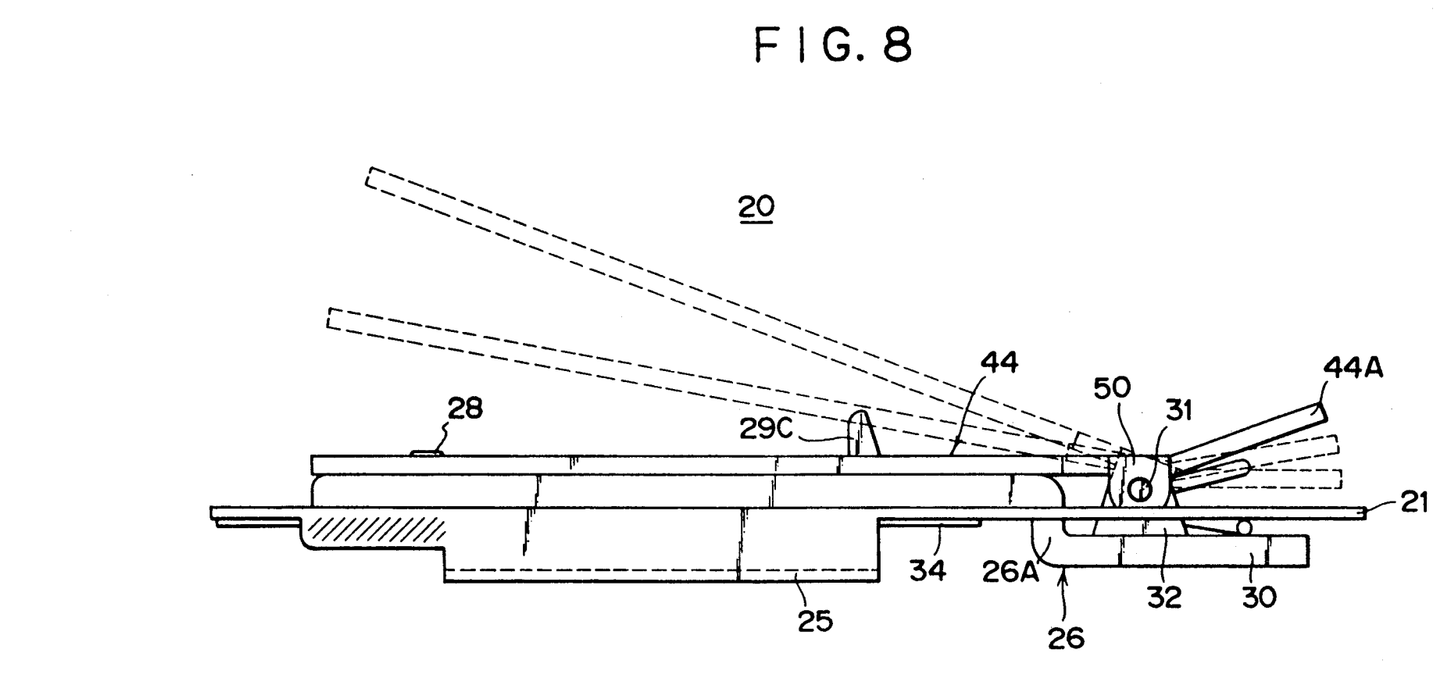
FIG. 8 is a side view of the aforesaid film holder.
Figure 9:
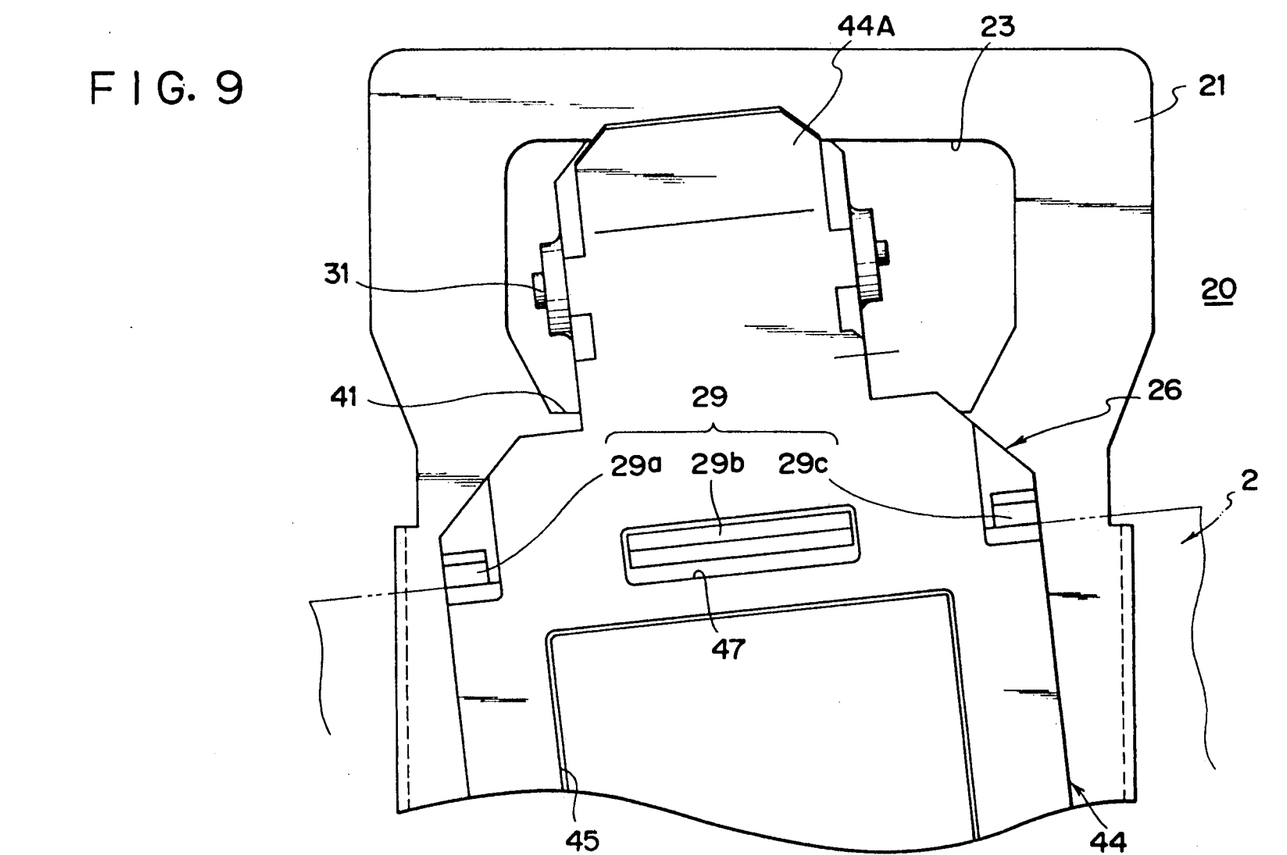
FIG. 9 is an enlarged plan view of the principal part thereof.
Figure 10:
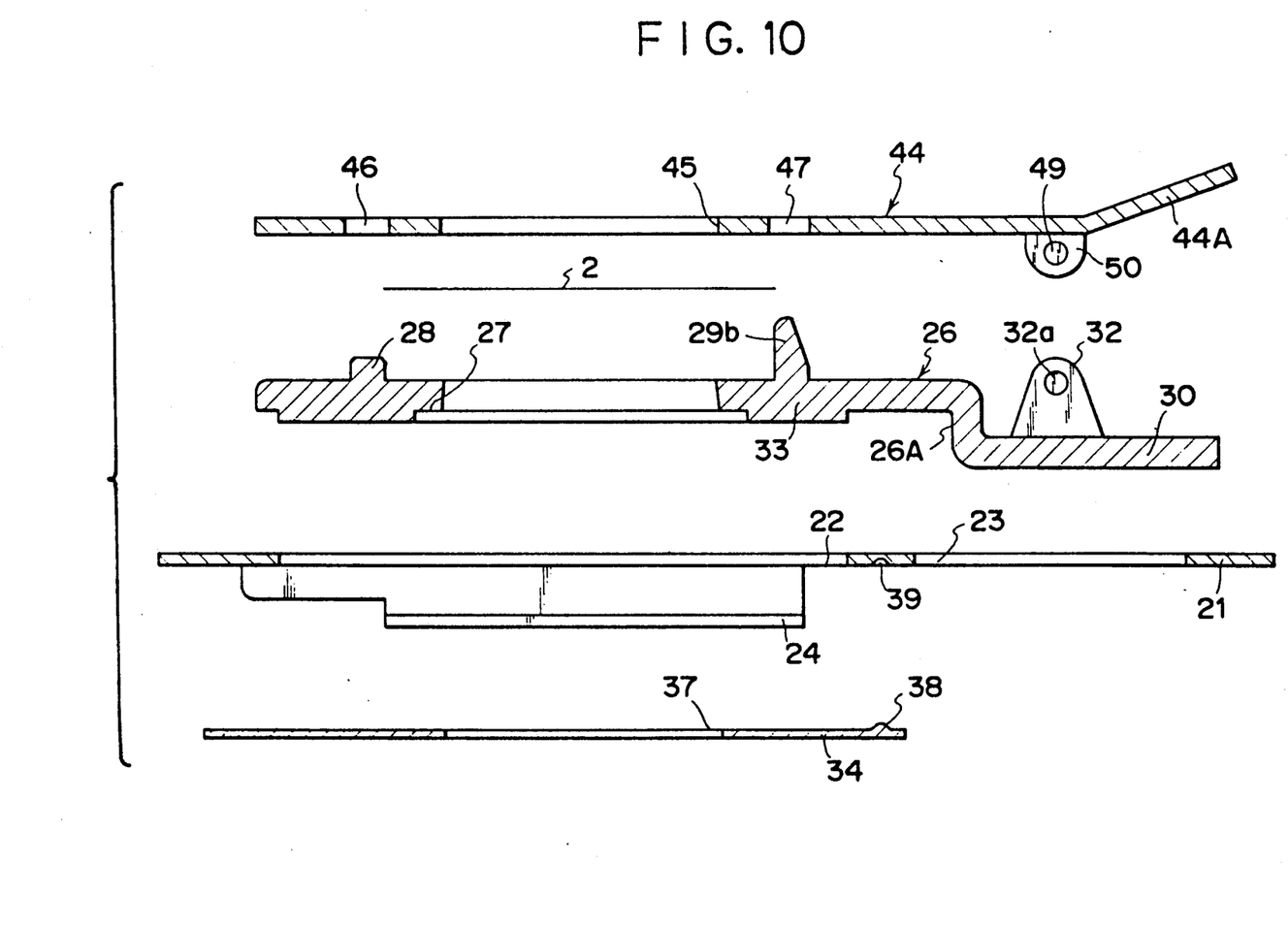
FIG. 10 is a disassembled cross-sectional views of the principal components thereof.

FIG. 4 is an enlarged section of a film holder according to the present invention taken along the line IV—IV of FIG. 5; FIG. 5 is a plan view of the aforesaid film holder; FIG. 6 is a bottom view of the aforesaid film holder; FIG. 7 is a bottom view of the aforesaid film holder after removing the clip plate thereof; FIG. 8 is a side view of the aforesaid film holder; FIG. 9 is an enlarged plan view of the principal part thereof; and FIG. 10 is a disassembled cross-sectional views of the principal components thereof. In FIG. 4 through FIG. 10, a film holder 20 is provided with an oblong base plate 21 elongated in the fore and back directions. The base plate 21 is made of metal, and is formed with its trailing end which is wider than its leading end, having two openings 22 and 23 comprising a round hole and an oblong hole at its front and back sides. Also, along both sides of the leading end thereof, bending portions 24 and 25 formed by bending the sides substantially in L-letter shape toward the insides, which are integrally provided for the base plate. These bending portions 24 and 25 are fittedly held by a holder base (not shown) of the main body of the systems to position the film holder 20 on the main body of the systems so that it is fixed thereto. On a part of the periphery of the aforesaid opening 22, a cutaway concave portion 22A of long circular shape in the circumferential direction is conjunctly provided as shown in FIG. 7 to regulate angles.

A reference numeral 26 designates a film receiving plate arranged on the aforesaid base plate 21, and this film receiving plate 26 is formed by a molded plate of resin or the like, having at its leading portion an oblong film window 27 substantially equal to or slightly larger than the size of one frame of the film 2. Also, on the front and rear sides of the upper surface of the film receiving plate 26, there are provided a front positioning projection 28 for positioning the film 2 in its fore and back directions and a rear positioning projection 29 across the film window 27. The aforesaid positioning projection 28 comprises a one pin projectedly arranged in the center of the film receiving plate 26 in the left and right directions. The rear positioning projection 29 comprises three projections 29a, 29b, and 29c arranged in series in the left and right directions of the film receiving plate 26 as shown in FIG. 5, and the central projection 29b is formed sufficiently longer than the projection 29a and 29c on both sides thereof.

The trailing portion of the aforesaid film receiving plate 26 is formed with a narrow width and at the same time, its connecting portion 26A to the leading portion thereof is bent downward so as to place this portion lower than the base plate 21 from the rear opening 23 of the aforesaid base plate 21 to form a mounting portion 30 for a shaft 31. Accordingly, on both sides of the upper face of the mounting portion 30, a pair of bearing portions 32 (FIG. 10) with axle holes 32a are provided for the ends of the shaft 31 to be inserted therethrough. On the leading end of the reverse side of the aforesaid film receiving plate 26, a circular projection 33 (FIG. 4, FIG. 7 and FIG. 10) is integrally provided with the aforesaid film window with the centers thereof being matched substantially. This projection 33 has an outer diameter substantially equal to the circular hole opening 22 of the aforesaid base plate 21 and a thickness substantially equal to that of the base plate 21, and is rotatively fitted into the aforesaid opening 22 from the above. Accordingly, the aforesaid opening 22 forms a bearing hole for the film receiving plate 26. Also, on a part of the outer periphery of the aforesaid projection 33, a circular projection 33A (FIG. 7) is provided to be inserted into the aforesaid cutaway concave portion 22A to regulate angles. This projection 33A is shorter than the aforesaid cutaway concave portion 22A, and the aforesaid film receiving plate 26 is allowed to rotate against the aforesaid base plate 21 by the degree of an angle corresponding to the difference in the lengths thereof.

In this respect, the centers of the aforesaid opening 22 and the film window 27 are substantially matched.

A reference numeral 34 designates a clip plate. This clip plate 34 has a diameter larger than the aforesaid projection 33 and is closely in contact with the projection 33 from the reverse side of the base plate 21. Further, being fixed by a plurality of set screws 36, this plate prevents the slipping off of the film receiving plate 26 from the base plate 21. In the central portion of the aforesaid clip plate 34, an elongated hole 37, which is larger than the aforesaid film window 27 is oval elongated in the left and right directions, is provided. Also, on the upper face of the leading portion of the clip plate 34, a small semispheric projection 38 is provided and at the same time, a slit groove 38A (FIG. 6) is formed on both side thereof thereby making the portion where the aforesaid projection 38 is provided a tongue portion 42 which can be resiliently deformed. With respect to the aforesaid projection 38, a small concave portion 39 (FIG. 7) is formed on the reverse side of the aforesaid base plate 21; thus constituting a click mechanism for the film receiving plate 26.

In this case, when the projection 38 is fitted into the concave portion 39, the film receiving plate 26 is at zero degree against the base plate 21 in terms of its inclination in the left and right directions. Also, at this juncture, the shoulder portion 40 (FIG. 5) of the film receiving plate 26 and the front edge 41 (FIG. 6) of the rear opening 23 of the base plate 21 should overlapped with each other linearly; thus making it also possible to confirm thereby to which side the film receiving plate 26 is inclined with respect to the base plate 21.

A reference numeral 44 designates a pressure plate arranged on the aforesaid film receiving plate 26 to be opened or closed freely, and this pressure plate 44 is made of metal plate in a form substantially identical to that of the aforesaid film receiving plate 26, having a film window 45 in its leading portion with respect to the film window 27 of the aforesaid film receiving plate 26. The film windows 27 and 45 are substantially the same in size. Also, in the leading portion of the pressure plate 44, two through holes 46 and 47 (FIG. 5 and FIG. 10) are formed in the front and rear across the aforesaid film window 45. The front through hole 46 is round, through which the front positioning projection 28 of the aforesaid film receiving plate 26 is inserted. The rear through hole 47 is elongated in the left and right directions, through which the longest central projection 29b of the three rear positioning projections 29 of the film receiving plate 26 is inserted. In the trailing portion of the pressure plate 44, the width of the portion where aforesaid through hole 47 is formed is defined slightly narrower than the distance between the projections 29a and 29c at the left and right sides respectively of the aforesaid rear positioning projections 29. Also, the trailing portion of the pressure plate 44 constitutes an operating unit 44A at the time of opening or closing motion, and its width is formed narrow to be pivotally mounted on the installation portion 30 of the aforesaid film receiving plate 26 through the aforesaid shaft 31 and is opened or closed freely in the vertical direction. As a result, a pair of the left and right bearing portions 50 (FIG. 10), having axle holes 49 for the aforesaid shaft 31 to be inserted therethrough, are mounted projectingly downward on the operating portion 44A of the pressure plate 44 in such a manner that these portions are overlapped with the bearing portions 32 of the film receiving plate 26 in the thickness direction of the plate. Then, on the aforesaid shaft 31, a torsion coil spring 51 having a comparatively large spring force is installed to exert tension on the aforesaid pressure plate 44 in the closing direction, there by pressing the pressure plate 44 always in contact with the upper face of the film receiving plate 26.

In this respect, the maximum opening angle of the pressure plate 44 is approximately 30 degrees, and the angle is regulated in such a way that the operating portion 44A is in contact with the upper face of the trailing portion of the base plate 21 if it is wider than the maximum allowable angle.

In the film holder 20 structure such as this, when the film 2 is set the shoulder portion 40 of the film receiving plate 26 and the leading edge 41 of the opening 23 of the base plate 21 is aligned. Subsequently, the installation portion 30 of the film receiving plate 26 and the operating portion 44A of the pressure plate 44 are held to depress the operating portion 44A against the spring force of the torsion coil spring 51. Then, the pressure plate 44 is opened within the limit of the aforesaid maximum angle, and the film 2 is inserted between the pressure plate 44 thus opened and the film receiving plate 26 from front or side. The trailing edge thereof is pressed to the front side of the rear positioning projection 29 and is dropped into the space between the front positioning projection 28 and the rear positioning projection 29 to place the film on the film receiving plate 26. Then, when the compression given to the operating portion 44A is released, the pressure plate 44 is closed by the spring force of the torsion coil spring 51 to cause the film 2 to be in contact with the upper face of the film receiving plate 26 under pressure. FIG. 5 shows this state. After this, it is examined to confirm whether or not the filmed image is inclined to the image angle of the film receiving plate 26. If the image angle of the film 2 is inclined to that of the film receiving plate 26, it is possible to correct such inclination by rotating the film receiving plate 26 together with the pressing plate 44 against the base plate 21 in the left and right directions. At this juncture, the horizontal reference point for the correction of the inclination is the front edge 41 of the aforesaid opening 23.

Now, when the inclination of the film 2 is corrected, the film holder 20 is fixedly positioned in the main body of the systems with the guiding of the outer side faces (portion represented by slant lines in FIG. 8) of the bent portions 24 and 25 of the base plate 21 as described earlier.

In this respect, according to the abovementioned embodiment, the opening 22 is provided on the base plate 21 to form the bearing hole, and the description has been made of the case where the projection 33 is projectingly arranged on the film receiving plate 26 to fit the projection thereinto. The present invention is not limited thereto, and the arrangement may also be made in reverse as a matter of course.

As set forth above, in the film holder of the present invention, the film receiving plate and the pressure plate, which hold the film therebetween, is rotatively arranged within the surface of the base plate; thus making it possible to correct the inclination of the filmed image simply by the single body of the film holder itself without any optical aid of the main body of the systems. As a result, the correcting operation can be performed with ease. In addition, there are no need for the provisions of various parts including optical parts and the like which have traditionally been required for such correc-tion; hence not only enabling the miniaturization of the systems with a lighter weight thereof, but also implementing the significant improvement of the operativity and other practical effects because the film setting operation can be carried out simply in such a way that the film is mounted on the film receiving plate with the pressure plate being opened for the minimum amount required at the time of setting the film on the film holder as the pressure plate is in contact with the film receiving plate by the tension of the spring, and the film is compressed onto the film receiving plate when the pressure plate is closed to set the film at the predetermined position reliably.

What is claimed is:

1. The structure of a film holder including the following:

a base plate;

a film receiving plate having film positioning projections and a film window, which is arranged rotatively within the surface of said base plate;

a pressure plate having a film window, and, in cooperation with said film receiving plate, holding the the film therebetween;

pivotally supporting means for supporting said pressure plate pivotally against said film receiving plate to allow said pressure plate to be opened or closed freely with respect to said film receiving plate; and spring means for providing a rotational peculiarity for said pressure plate in the closing direction to cause said pressure plate to be in contact with said film receiving plate under pressure.

2. The structure of a film holder according to claim 1, wherein said base plate is provided with an installation portion for fixedly positioning itself in the main body of an image transmitter or the like.

3. The structure of a film holder according to claim 1, wherein said pressure plate comprises a film pressing portion which extends toward one side of said pivotally supporting means, and an operating portion capable of performing opening or closing manually, which extends toward the other side of said pivotally supporting means.

4. The structure of a film holder according to claim 1, wherein:

said base plate is provided with a substantially circular opening; and said film receiving plate is provided with a disc type projection which is fitted into said circular opening, and is arranged rotatively on said base plate.

5. The structure of a film holder according to claim 4, wherein:

on a part of the periphery of the opening of said base plate, a circular cutaway concave portion elongated in the circumferential direction is provided to regulate angles;

a circular projection portion is provided on a part of the outer periphery of the circular projection of said film receiving plate, which is inserted into the cutaway concave portion of said base plate to regulate angles; and said film receiving plate is allowed to be rotated by a predetermined angle to said base plate.

6. The structure of a film holder according to claim 4, wherein said film holder further includes the following:

a clip plate having a larger diameter than said circular projection, being in close contact with said circular projection from one side of said base plate to prevent said film receiving plate from being slipped off from the said base plate, said clip plate comprising an elongated hole larger than said film window having a long oval shape elongaged in the left and right directions, a semispheric projection provided on the upper surface in the vicinity of the outer periphery of said clip plate, and a tongue portion which can be resiliently deformed by providing slit grooves on both sides of said semispheric projection, said base plate being provided with a small concavity of small oval shape elongated in the normal direction on said one face; and a click mechanism formed by said semispheric projection and the concavity of said base plate.

7. The structure of a film holder according to claim 6, wherein said base plate is provided with an oblong hole having a linear edge, and said film receiving plate being provided with a shoulder portion which aligns with said linear edge each other when said semispheric projection of said click mechanism is fitted into the concavity of said base plate.

* * * * *